United States Patent [19]

Taylor

[11] 4,027,933

[45] June 7, 1977

[54] SHAFT BUSHES

[76] Inventor: Gordon Joseph Taylor, 18 Seng St., Graceville, Queensland 4075, Australia

[22] Filed: June 18, 1976

[21] Appl. No.: 697,462

[30] Foreign Application Priority Data
June 24, 1975   Australia .......................... 2109/75

[52] U.S. Cl. ............................................ 308/238
[51] Int. Cl.[2] ...................................... F16C 27/00
[58] Field of Search ........... 308/237 R, 237 A, 238, 308/26, 36, 236, 36.1; 403/158, 365; 285/275, 27 B

[56] References Cited

UNITED STATES PATENTS

| 1,124,707 | 1/1915 | Cowan | 308/236 |
| 3,300,259 | 1/1967 | Howard | 308/238 X |
| 3,356,426 | 12/1967 | Fadow | 308/238 |
| 3,458,214 | 7/1969 | West | 308/238 X |

*Primary Examiner*—Joseph F. Peters, Jr.
*Assistant Examiner*—Gene A. Church
*Attorney, Agent, or Firm*—Donald D. Jeffery

[57] ABSTRACT

A bush for mounting a shaft through a housing, includes two threaded parts and external radial opposed faces, so that the length of the bush between faces may be varied by relative rotation to clamp the bush tightly against the housing.

An eccentric sleeve may cooperate with an eccentric flange on the bush to adjust the axis of the bush with respect to the housing axis.

6 Claims, 3 Drawing Figures

SHAFT BUSHES

BACKGROUND OF THE INVENTION

This invention relates to bushes for between a shaft and a housing surrounding said shaft.

The invention is particularly applicable to bushes for brake shafts in air or vacuum brakes, such as those used in heavy transport vehicles, and will be described in relation to this.

Such air-pressure or vacuum brakes are well-known. In their usual form, a linkage operated by the air source turns a brake shaft which moves the brake shoes to or from the brake drum.

The actuating shaft is supported in a bush mounted in a housing to maintain the shaft axis accurately in position. The usual prior-art bush has consisted of a two-part structure, the parts when together forming a bobbin with the parts abutting along the transverse centre plane of the bobbin. The bobbin is mounted with the end plates of the housing adjacent the ends of the bobbin but with a designed clearance therefrom.

Such a bobbin cannot be made a tight fit in the housing endwise, and movements of it during brake operation result in rapid wear of the housing and of the shaft. A further disadvantage is that considerable labour time is needed is dismantling the housing and shaft for repairs.

SUMMARY OF THE PRESENT INVENTION

An object of this invention is to provide a bush which may be tightly fitted endwise in a housing, thus preventing relative movement and reducing wear of the parts.

Another object is to enable quicker and cheaper repair or replacement.

A further object of one embodiment is to enable angular axial adjustment of the bush so that it lies accurately co-axial with its shaft and prevents uneven wear.

Accordingly the invention in one aspect comprises a bush including a first part threaded at one end; a second annular part correspondingly threaded to engage the thread on said first part; and external inwardly-facing radial faces on said first and on said second parts; so that the length of the bush between said faces may be adjusted by relative rotation of said parts to engage tightly against a housing for said bush.

BRIEF DESCRIPTION OF THE DRAWINGS

In order that the invention may be better understood, an embodiment will be described with reference to the accompanying drawings in which.

DESCRIPTION OF THE INVENTION

Figure 1:
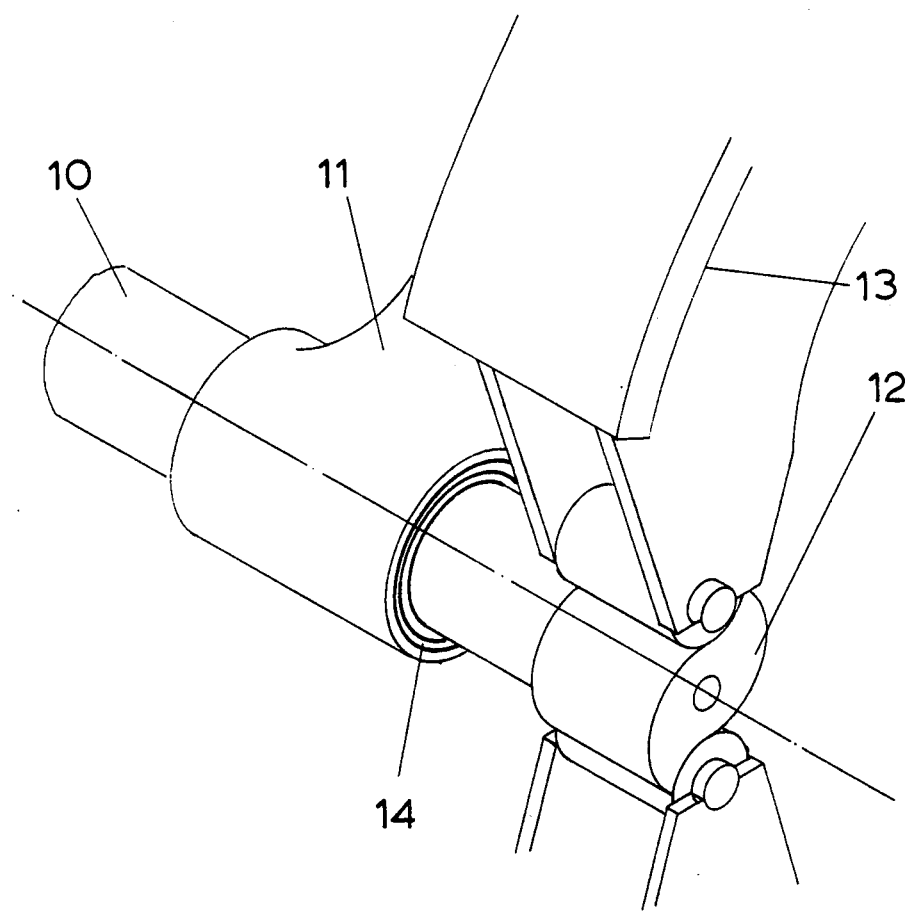
FIG. 1 shows a perspective view of part of an air brake system with the bush of this invention in place.

Referring first to FIG. 1 a rotatable shaft 10 passes through an apertured housing 11 (usually welded to the vehicle axle) and carries the usual member 12 operating the brake shoes 13. Shaft 10 is rotated by a radial member (not shown) turned by the air-operated piston.

A bush 14 according to this invention is provided between shaft 10 and the bore of housing 11, being recessed in housing 11 so that its end faces are flush with the housing.

Figure 2:
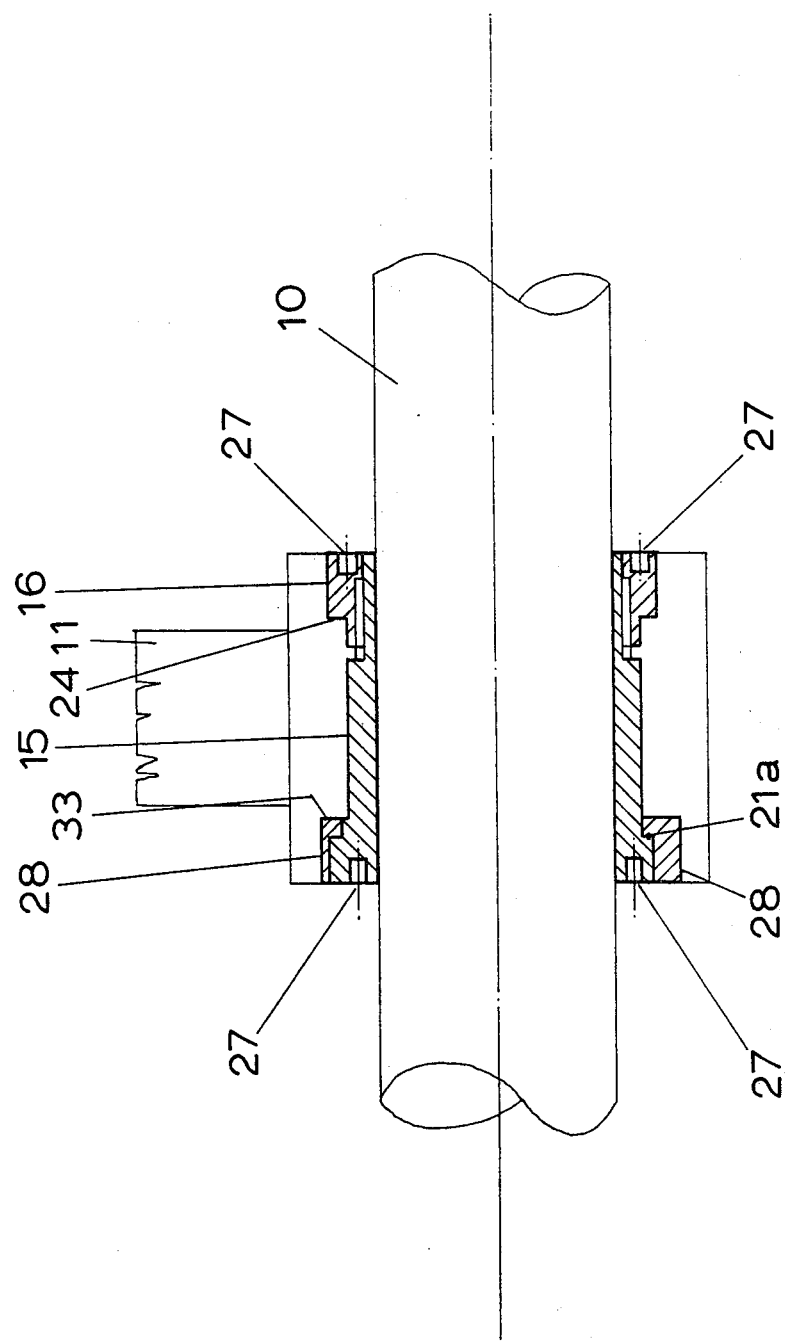
FIG. 2 shows a section of the bush with part of the shaft and housing.
Figure 3:
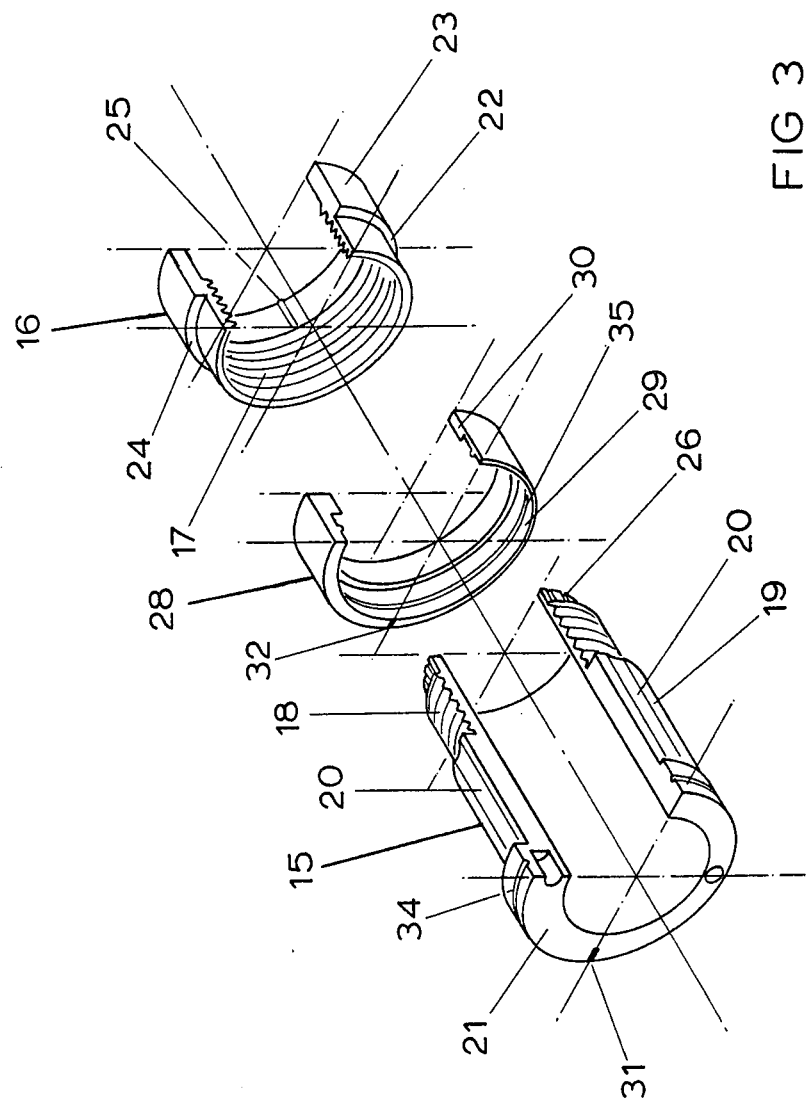
FIG. 3 shows an exploded view of the bush partly sectioned.

Referring to FIGS. 2 and 3, the bush 14 has two main parts 15 and 16 of tough plastic material such as nylon 66, part 16 being internally threaded at 17 to engage an external thread 18 on part 15.

Part 15 has a hollow cylindrical body 19 longitudinally fluted at 20 to facilitate slight expansion during force-fitting within housing 11 and over shaft 10. The end of part 15 is expanded at 21 to form a flange having a radial face 21A adjoining body 19.

Part 16 has a cylindrical part 22 carrying thread 17 extending from an expanded end flange 23 with a radial face 24 adjoining part 21. Flange 23 carries an internal tooth 25 which engages teeth 26 on part 15 when parts 15, 16 are threadedly engaged to prevent relative rotation of the parts due to vibration.

As so far described, the bush may be assembled on shaft 10 (as best shown in FIG. 2) and the parts screwed together so that radial faces 21A and 24 clamp tightly against internal radial faces on the housing 11, preventing movement of bush 14 relative to the housing. Holes 27 in flanges 21, 23 are provided to enable tightening by a suitable tool.

In the embodiment shown, a third part 28 is used, having a cylindrical hollow sleeve 29 and an inward flange 30, the inner surfaces being slightly eccentric to the outer surfaces (the eccentricity is exaggerated in FIGS. 2 and 3). Flange 21 on part 15 is also made eccentric.

As shown in FIG. 2, sleeve 29 fits over flange 21 of part 15 and is rotatable thereon, so that bush 14 may be accurately aligned with shaft 10. A groove 34 on flange 21 is engaged with an inner circumferential ridge 35 on part 28 to hold parts 15, 28 together during assembly. Marks 31 on flange 21 and 32 on sleeve 29 indicate the relative positions of parts 15, 28. This radial adjustment feature ensures that bush 14 may be fitted squarely on shaft 10 and any wear is not uneven.

When part 28 is used, the inner radial face 33 of flange 30 and face 24 clamp against housing 11 (rather than faces 21A and 24), and when clamped, any further relative rotation of parts 15, 28 is prevented.

If part 28 is omitted and only parts 15, 16 are used, it is still necessary to make faces 24, 21a radial and the whole bush of tough plastic material with some capacity for deformation. The reason is that, to enable a tight fit to housing 11, a true face-to-face contact is essential with capacity for minute adjustment of position. Any appreciable departure from radiality (e.g. conical shape) tends to give self-centring and prevents such adjustment.

I claim:

1. A shaft bush of tough, deformable material and including; a first part threaded at one end; a second annular part correspondingly threaded to engage the thread on said first part; and external inwardly-facing radial faces on said first and on said second parts; so that the length of said bush between said faces may be adjusted by relative rotation of said parts to clamp said bush tightly against a housing for said bush.

2. A bush as claimed in claim 1, in which said assembled bush is of bobbin shape with an external flange at each end.

3. A bush as claimed in claim 2, in which one said flange is eccentric to the bore of the bush, and a third part is provided having a sleeve which fits rotatably over said eccentric flange, the outer surface of said sleeve being eccentric to its bore.

4. A bush as claimed in claim 3, in which said third part has an inward flange attached to said sleeve, said inward flange abutting against said radial face of one said part and the inner face of said inward flange forming one clamping face of said bush.

5. A bush as claimed in claim 1 in which one said part includes resilient peripheral teeth engagable by an opposed tooth on the other said part, whereby unwanted relative rotation of the said parts is restrained.

6. An air or vacuum brake system for a vehicle including a rotatable shaft, means on said shaft for operating the brake-shoes of said vehicle, a bush housing surrounding said shaft, and a bush in accordance with claim 3 between said housing and said shaft, the end faces of said bush being substantially flush with the end faces of said housing.

* * * * *